United States Patent [19]

Unno et al.

[11] 4,067,937
[45] Jan. 10, 1978

[54] METHOD FOR FORMING A LIGHT TRANSMISSION GLASS FIBER EQUIPPED WITH AN OPTICAL LENS

[75] Inventors: Yoichi Unno, Kamakura; Naoto Motegi, Yokohama; Takao Ito, Kawasaki, all of Japan

[73] Assignee: Tokyo Shibaura Electric Co., Ltd., Kawasaki, Japan

[21] Appl. No.: 703,191

[22] Filed: July 7, 1976

[30] Foreign Application Priority Data

July 7, 1975 Japan .................... 50-82780

[51] Int. Cl.² ............... B01D 47/00; C03B 11/08; C03C 25/02
[52] U.S. Cl. ........................... 264/1; 65/37; 65/39; 65/60 B; 65/DIG. 7; 65/3 C; 427/163; 427/165; 427/169
[58] Field of Search ............... 65/37, 36, 59 R, 59 A, 65/59 B, DIG. 7, 39, 60 B, 3 C; 264/1; 350/96 B; 427/163, 169, 165

[56] References Cited

U.S. PATENT DOCUMENTS

| 303,607 | 8/1884 | Arehcibia | 65/59 R X |
|---|---|---|---|
| 1,466,973 | 9/1923 | Takanashi | 65/37 X |
| 3,288,585 | 11/1966 | Clarke | 65/37 |
| 3,347,651 | 10/1967 | Lueck | 65/59 B X |
| 3,490,889 | 1/1970 | Goto et al. | 65/59 A X |
| 3,724,924 | 4/1973 | Lenfant et al. | 65/DIG. 7 |
| 3,742,731 | 7/1973 | Phillips et al. | 65/DIG. 7 |
| 3,930,824 | 1/1976 | Knowles et al. | 65/37 |

*Primary Examiner*—S. Leon Bashore
*Assistant Examiner*—Frank W. Miga
*Attorney, Agent, or Firm*—Oblon, Fisher, Spivak, McClelland & Maier

[57] ABSTRACT

An optical lens equipped glass fiber is formed by bringing at least one end of a glass fiber into contact with an optical lens forming liquid-like material with the liquid-like material deposited onto the end of the glass fiber in a manner to have a curvature due to its surface tension and, after lifting it up, allowing the deposit to stand for solidification so as to obtain an optical lens on the end of the glass fiber.

11 Claims, 6 Drawing Figures

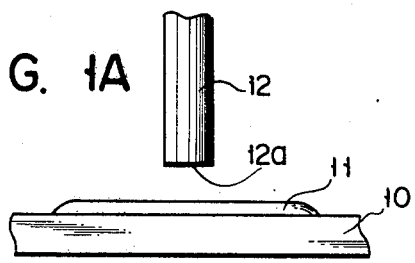
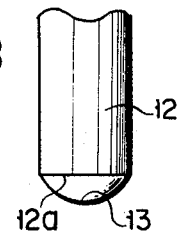
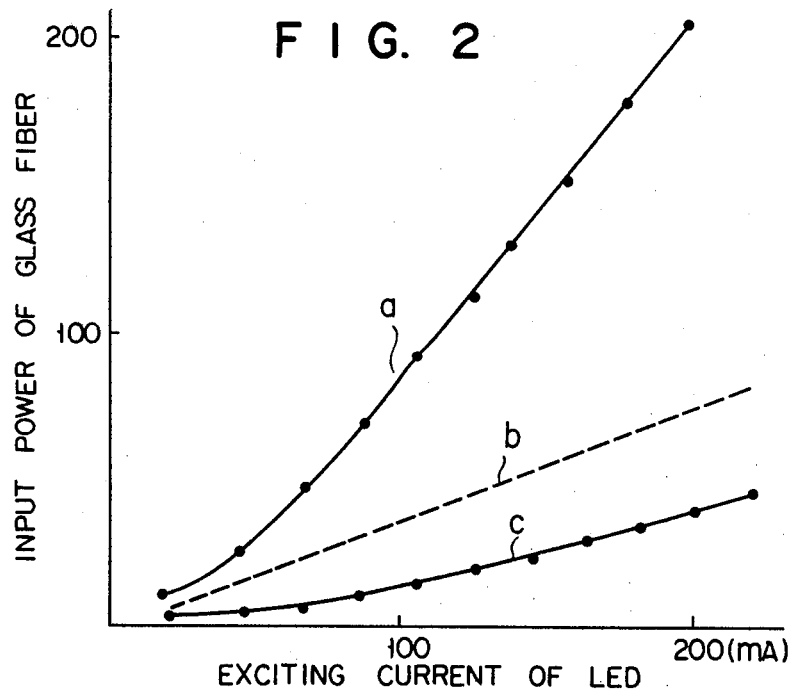
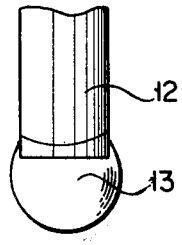
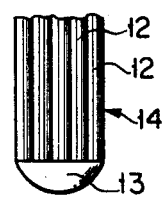
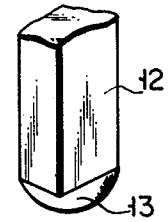

METHOD FOR FORMING A LIGHT TRANSMISSION GLASS FIBER EQUIPPED WITH AN OPTICAL LENS

BACKGROUND OF THE INVENTION

This invention relates to the manufacture of a light transmission glass fiber with an optical lens formed on the end.

A glass fiber of this kind is known which guides an incident light effectively therethrough, and finds an application primarily in a field of communication. It is known to thermally melt the end of a glass fiber so as to form an optical lens on that end of the glass fiber. In the known method, however, it is necessary that heating temperature and heating time be accurately controlled. Furthermore, glass fibers are manufactured in poor yield due to their varying characteristics.

SUMMARY OF THE INVENTION

It is accordingly the object of this invention to provide a method for manufacturing light transmission glass fibers which can easily form an optical lens on the end in good yield.

BRIEF DESCRIPTION OF THE DRAWING

FIGS. 1A and 1B are side views for illustrating a method for manufacturing an optical lens according to one embodiment of the present invention wherein FIG. 1A is a schematical view showing one step of the manufacturing method and FIG. 1B shows an optical lens manufactured by the method of the present invention.

FIG. 2 is a curve diagram showing a comparison in characteristic between a glass fiber according to this invention and a prior art glass fiber; and FIGS. 3 to 5 show modified forms of the glass fiber manufactured by the present invention.

DETAILED DESCRIPTION OF THE PREFERRED EMBODIMENTS

According to this invention a method for the manufacture of an optical transmission glass fiber comprises the steps of bringing at least one end of a glass fiber body into contact with an optical lens forming liquid-like material so that the liquid-like material is deposited onto the end of the glass fiber body due to its surface tension and solidifying the liquid-like material to form an optical lens on the end of the glass fiber body.

A glass fiber body herein described may be a single glass fiber or a bundle of glass fibers. The glass fiber body may have a circular, elliptical, rectangular, annular and the other cross section and no particular restriction is made to the shape of the cross section. An optical lens forming liquid-like material herein described means a liquid-like organic compound, molten glass and the like, which can be solidified as required and serve as an optical lens. As the organic compound use may be made of, for example, a bisphenol type epoxy resin, Canada balsam and acrylic resin. Of these materials, the bisphenol type epoxy resin is excellent in adhesion to the glass fiber body and a lens formed of the bisphenol type epoxy resin is smooth in its surface, providing an excellent product.

A method for the manufacture of an optical lens equipped glass fiber will now be explained below. The formation of an optical lens on one end of a single cylindrical glass fiber body of 100 to 120 $\mu$ in outer diameter will be explained by referring particularly to FIGS. 1A and 1B.

A liquid-like organic material, for example, a bisphenol type epoxy resin commercially available under the trade name of Araldite (Ciba Limited) CY230 is dropped onto a plane glass plate 10 to form a liquid pool or a liquid film 11. A vessel may be used in place of the plane glass plate 10, but the plane glass plate permits an easy manufacture in high yield. A glass fiber body 12 is suspended, as shown in FIG. 1A, in a direction substantially vertical to the liquid film 11 on the glass plate 10 and brought into contact with the liquid film 11. The glass fiber body 12 may be of a known type and its preferred to have a plane end surface. The plane end surface of the glass fiber body permits formation of an excellent optical lens. If the glass fiber body has an uneven end surface, use may be made of a glass fiber body with an even end surface cut off in a horizontal direction. One end 12a of the glass fiber body 12 is lifted up in a vertical direction after it has been brought into contact with the liquid film 11. At this time, the Araldite material 11 is attached onto the end 12a of the glass fiber body 12 in such a manner as to have a curvature due to its own surface tension. When the glass fiber body is true-circular in cross section, the deposited Araldite assumes a substantially part-spherical or hemispherical configuration. When, however, the glass fiber body has another cross section at the end, the deposited Araldite may take a variety of forms dependent upon the shape of the end 12a. That is, the Araldite deposit has a predetermined shape if the glass fiber body has a predetermined end shape. With the Araldite deposited onto the end 12a the glass fiber body 12 is allowed to stand for a predetermined time, causing the Araldite deposit to be solidified to permit a resin optical lens 13 to be formed on the end 12a of the glass fiber body 12. In consequence, the resin optical lens is substantially similar in shape to the deposited Araldite.

FIG. 1B shows the optical lens 13 formed on the end surface 12a of the glass fiber body 12. A light from a light emitting diode (LED) was incident through the optical lens 13 into the glass fiber body 12 and measurement was made of a relation of the characteristic of a light power inputted into the glass fiber body 12 to electric current passed through the light emitting diode, the result of which is indicated in a curve $a$ in FIG. 2. In FIG. 2 the fiber input is plotted as an ordinate and the exciting current of the light emitting diode is plotted as an abscissa. FIG. 2 also shows the case where the end of the glass fiber was molten as in the prior art so as to provide an optical lens (a curve $b$) and the case where no optical lens is formed at the end of a glass fiber body (a curve $c$). From this characteristic diagram in FIG. 2 it will be seen that for an exciting current of about 100 mA the input power i.e. a coupling efficiency (this invention is about two times as great as that in the prior art and for an exciting current of 200 mA the input power (this invention) is about three times as great as that in the prior art.

According to this invention, an optical lens equipped glass fiber can be formed by vertically bringing the end of the glass fiber in contact with an optical lens forming liquid-like material maintained at constant viscosity, vertically lifting it up with the liquid-like material deposited onto the end of the glass fiber body and allowing the deposit to stand for a predetermined time so as to effect solidification. If such steps are continuously effected, excellent glass fiber with uniform quality can be obtained in good yield.

Although in the above-mentioned embodiment the end of the glass fiber body is vertically brought into contact with, and vertically lifted up off, the liquid-like material, this invention is not restricted to this case. For example, the end of the glass fiber body may be tilted into contact with the liquid like material and raised up with the glass fiber body kept tilted. In this case, the deposit does not constitute a part-spherical configuration and, instead, it has a distorted curvature dependent upon the degree to which the glass fiber body is tilted. Such a distorted optical lens will be required for a particular application. When the end of the glass fiber body 12 is vertically dipped in the liquid-like material, the liquid-like material is also deposited onto the outer periphery surface of the end portion of the glass fiber body to obtain an optical lens 13 as shown in FIG. 3.

FIG. 4 shows an optical lens 13 formed on the end of a bundle glass fiber 14 which consists of a plurality of glass fiber bodies 12 and FIG. 5 shows an optical lens 13 formed on a glass fiber body 12 rectangular in cross section. In the later case, the optical lens constitutes part of an oval configuration except for a square cross section.

If in this invention selection is made of an optical-lens forming liquid-like material having a smaller refractive index to an incident light than that of the glass fiber body as well as a greater refractive index than that of an outer atmosphere, it is possible to obtain a glass fiber excellent in transmittance.

What we claim is:

1. A method for manufacturing a light transmission glass fiber, comprising a first step of bringing at least one end of a glass fiber body into contact with an optical lens forming hardenable adhesive liquid-like organic compound material; and a second step of withdrawing the one end of the glass fiber body to cause the liquid-like material to adhere to the one end of the glass fiber body with a curvature due to its surface tension before hardening, thereby forming an optical lens on the one end of the glass fiber body.

2. A method according to claim 1, in which said liquid-like material to be attached is placed in the form of a film on a flat plate.

3. A method according to claim 1, in which said glass fiber body is a single glass fiber.

4. A method according to claim 1, in which said glass fiber body is a bundle of glass fibers.

5. A method according to claim 1, in which the end of said glass fiber body has a circular plane.

6. A method according to claim 1, in which the end of said glass fiber body has a rectangular plane.

7. A method according to claim 1, in which said first step comprises vertically bringing the end of the glass fiber body into contact with said liquid-like material and said second step comprises vertically lifting it up off the liquid-like material.

8. A method according to claim 1, in which said liquid-like material has a smaller refractive index than that of said fiber glass body.

9. A method according to claim 1, in which said liquid-like material is a bisphenol type epoxy resin.

10. A method according to claim 1 in which said liquid-like material is Canada balsam.

11. A method according to claim 1, in which said liquid-like material is acrylic resin.

* * * * *